Feb. 28, 1956
C. A. BAKER
2,736,351
SLIDE BLOCK CONNECTION FOR RECIPROCATING FLUSH-CUTTING TOOL
Filed June 29, 1953
2 Sheets-Sheet 1
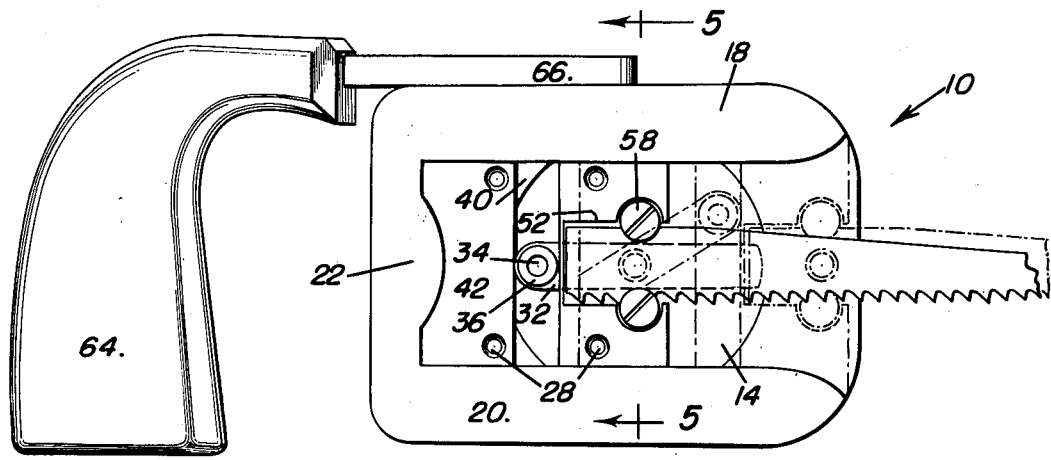
Fig.1
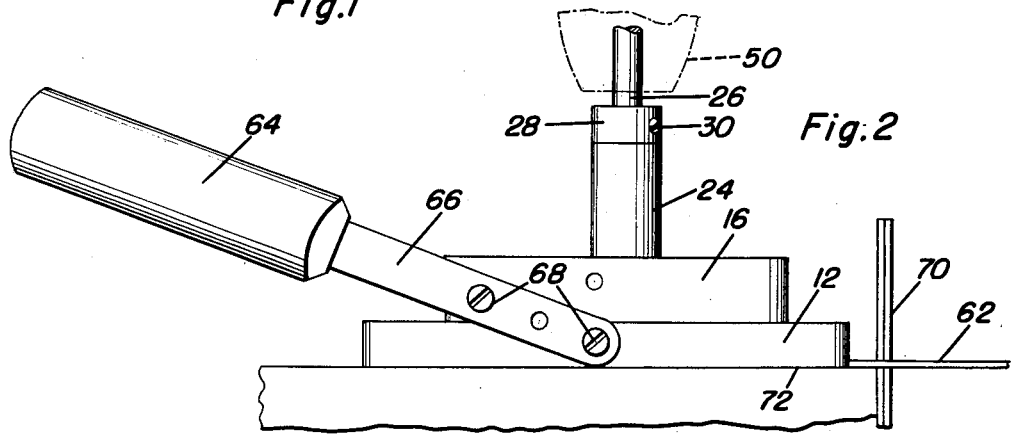
Fig.2
Fig.7
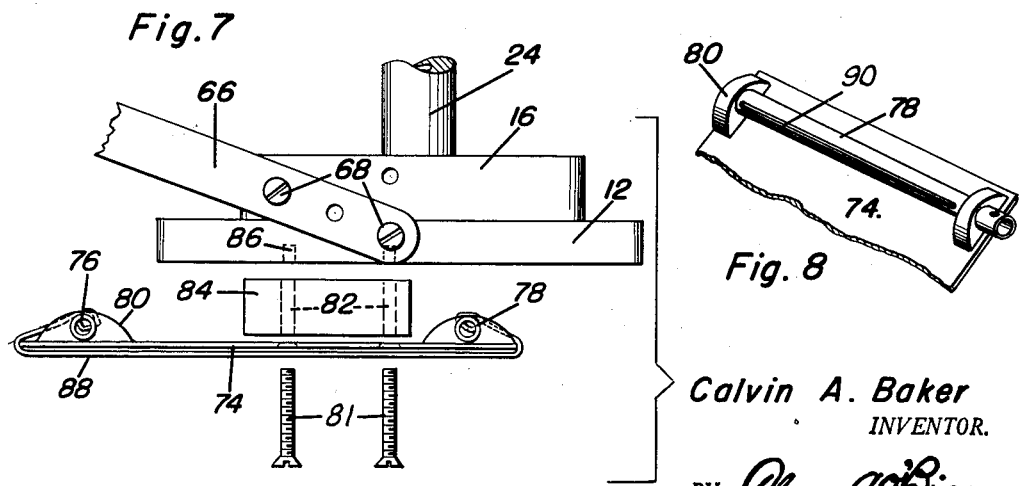
Fig. 8
Calvin A. Baker
INVENTOR.
BY *Clarence A. O'Brien*
*and Harvey B. Jacobson*
Attorneys Feb. 28, 1956 C. A. BAKER 2,736,351
SLIDE BLOCK CONNECTION FOR RECIPROCATING FLUSH-CUTTING TOOL
Filed June 29, 1953 2 Sheets-Sheet 2
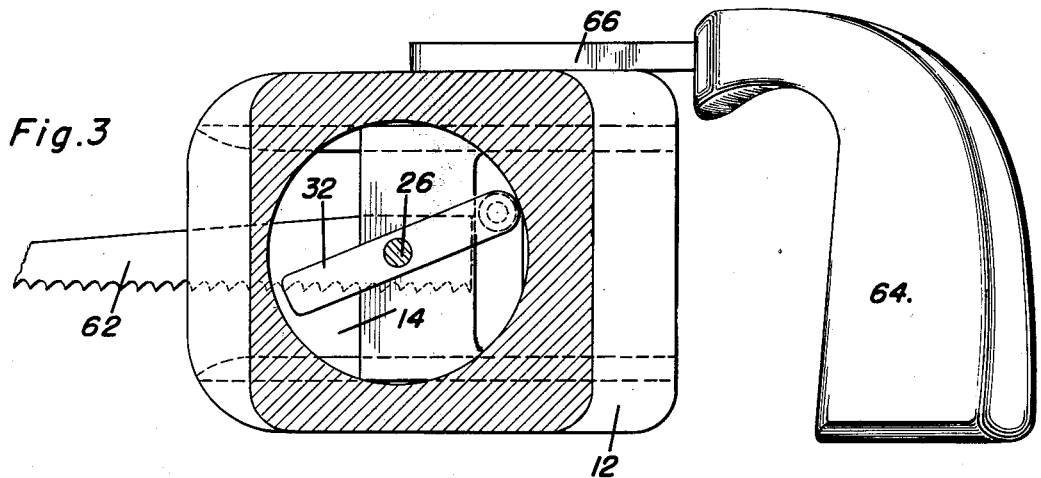
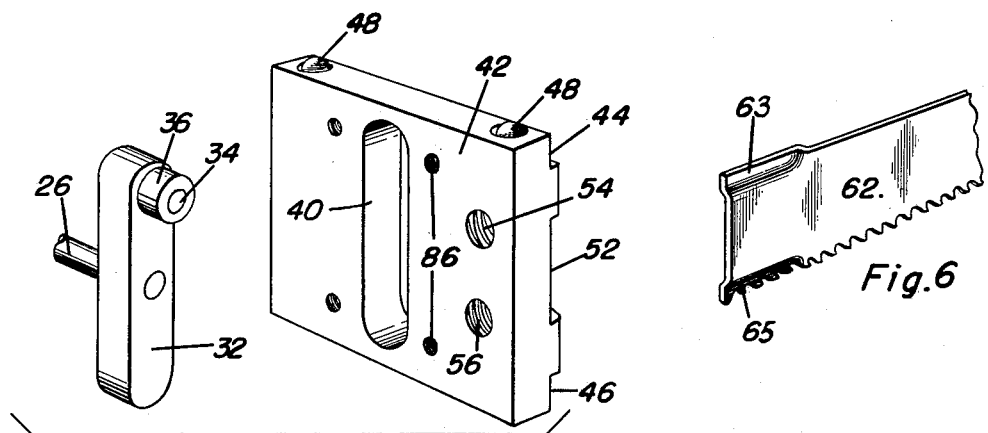
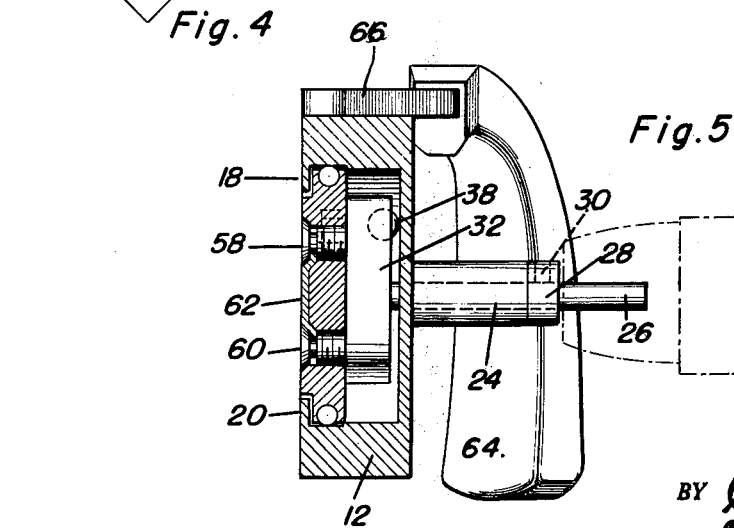
Calvin A. Baker
INVENTOR.

United States Patent Office 2,736,351
Patented Feb. 28, 1956

2,736,351

SLIDE BLOCK CONNECTION FOR RECIPROCATING FLUSH-CUTTING TOOL

Calvin A. Baker, Denver, Colo., assignor of twenty-five and one-half per cent to Glenn A. Laughlin and twenty-five and one-half per cent to James F. Friel, Denver, Colo.

Application June 29, 1953, Serial No. 364,867

1 Claim. (Cl. 143—60)

This invention relates to the class of tools and, more particularly, to a novel saw and sander adapted to be driven by a conventional hand power tool.

The construction of this invention features means for attaching and reciprocating a saw blade so that the saw blade will lie flush with the front of the saw thereby making it possible for the saw to cut flush with the wall surface and the like. In order to effectively achieve the objects of this invention, there is provided a slide block which is mounted for reciprocating or oscillatory movement within a casing. Means are provided to transmit power derived from a conventional hand tool such as a hand drill which is detachably secured on a drive shaft extending into the casing. There is also provided an angularly offset handle which enables the device to be properly held against the work piece.

One of the advantages of the invention resides in the fact that in lieu of the saw a sanding attachment may be secured to this tool. The sanding attachment includes a plate which is held in spaced relationship relative to the slide block which is provided with the oscillatory or reciprocating movement. This is to enable a comparatively larger sanding plate to be moved in accordance with the movements of the slide block.

Other objects and features of this invention reside in the provision of a combination saw and sander that is strong and durable, capable of being constructed, from a minimum number of parts, which is capable of having a saw blade of chosen characteristics easily detachably secured thereto and which tool is comparatively inexpensive to construct.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a side elevational view of the device comprised in the present invention;

Figure 2 is a top plan view of the combination saw and sander;

Figure 3 is a vertical sectional detailed view illustrating the construction of the means for oscillating or reciprocating the slide block;

Figure 4 is a perspective view of the slide block and the crank used in providing reciprocating motion to the slide block;

Figure 5 is a vertical sectional view as taken along the plane of line 5—5 in Figure 1;

Figure 6 is a perspective view illustrating the construction of the end portion of a saw blade utilized in combination with the present invention; and, Figure 7 (Sheet 1) is a exploded view illustrating the construction of a sander attachment used in cooperation with the other elements of the invention;

Figure 8 is a partial perspective view illustrating the means of attaching a sheet of sand paper to the sanding attachment.

With continuing reference to the accompanying drawings, wherein like reference numerals designate similar parts throughout the various views, reference numeral 10 generally designates the tool comprising the present invention. This tool 10 is designed for alternative use as a sander or as a saw and includes a casing 12 provided with a substantially centrally disposed recess 14 therein which recess 14 is integrally formed by inwardly offset portion 16 in the inner wall of the casing. The casing 12 has attached to its upper and lower outer peripheral edges flanges 18 and 20 which are joined by a central vertical connecting portion 22.

Attached to the innermost wall of the depression 16 is a shaft bearing 24 through which a shaft 26 extends, the shaft 26 also extending outwardly into the recess 14. A collar 28 secured to the shaft 26 by means of setscrew 30 is provided for limiting the outward movement of the outer end of the shaft 26 within the recess 14. Mounted on the shaft 26 is a crank 32, the crank 32 is adapted to be rotated by rotation of the shaft 26 within the recess 14 in the casing 12. The crank 32 has an arm 34 eccentrically disposed thereon, which arm may optionally have mounted thereon a bearing sleeve 36. There is also provided a thrust bearing 38 seated in the crank 32 and adapted to engage the innermost wall of the casing 12.

The arm 34 is adapted to ride within a slot 40, formed in a slide block 42, retained within the casing 12 by the flanges 18 and 20. As can be noted best in Figures 4 and 5, the slide block 42 is provided with grooves 44 and 46 in the upper and lower outer edge portions forming seats for the flanges 18 and 20. Ball bearings as at 48 are carried by the slide block 42 for reduction of friction. The slide block 42 is adapted to oscillate in the casing 12 due to the reciprocatory movement of the crank 32 which is driven by any conventional hand power tool such as indicated at 50. The slide block 42 is provided with a groove or recess 52 in the outer face thereof opening into the front edge. Extending through the slide block 42 are a pair of threaded apertures 54 and 56 within which threaded fasteners such as screws 58 and 60 are adjustably engaged. A saw blade 62 provided with crimps 63 and 65 in the upper and lower rear edge portions is seated in the recess 52 with the head of the screw fasteners 58 and 60 overlying and clampingly holding the blade 62 in proper position. Hence, upon imparting reciprocating motion to the slide block 42, the blade 62 will be actuated in an oscillatory back and forth motion so as to enable the saw to cut the material being worked upon. It is to be noted that the blade 62 and the outer face of the block 42 lie flush with the outer wall of the casing 12.

There is provided a suitable handle 64 having a connecting portion 66 attached by screws 68 or other suitable means to the casing 12, the handle 64 being offset at an acute angle relative to the plane of travel of the slide block 42 thereby enabling the saw to be readily and easily held against a suitable surface when a work piece or board as is indicated at 70 is desired to be cut off flush with the wall surface which is indicated at 72.

In order to convert this tool to a sander, there is provided a sanding plate attachment 74 which has a pair of tubular members 76 and 78 mounted thereon by means of pairs of semi-cylindrical support members 80. The plate assembly 74 is adapted to be secured by means of pairs of screws such as is indicated at 81 which extends through suitable apertures 82 formed in space blocks 84 which hold the plate 74 in spaced relationship relative to the outer face of the block 42. The screws 81 are threadedly engaged within the apertures 86 formed in the slide block 42. A piece of sand paper such as indicated at 88 is secured on the sanding block 74 by insertion in the elongated slots formed in each of the tubular members 76 and 78 and as shown at 90.

Since from the foregoing the construction and advantages of this combination saw and sander are readily apparent, further description is believed to be unnecessary.

However, since numerous modifications will readily occur to those skilled in the art after a consideration of the foregoing specification and accompanying drawings, it is not intended to limit the invention to the exact embodiment shown and described; all suitable modifications and equivalents may be readily resorted to, falling within the scope of the appended claim.

What is claimed as new is as follows:

A tool comprising a casing, a slide block slidably mounted in said casing, said slide block having a recess therein, a blade, a pair of threaded clamp members threadedly secured in said slide block, said clamp members having portions thereof overlying said recess and overlying opposed edges of said blade to clampingly hold said blade in said recess, said blade having crimps in said opposed edges extending inwardly from the outer face of said blade, said clamp members respectively engaging said crimps to lie flush with the outer face of said blade.

References Cited in the file of this patent

UNITED STATES PATENTS

| | | |
|---|---|---|
| 853,609 | Vartmann | May 14, 1907 |
| 1,620,374 | Maloney | Mar. 8, 1927 |
| 2,175,499 | Wodack et al. | Oct. 10, 1939 |
| 2,282,728 | Kern | May 12, 1942 |
| 2,328,613 | Burleigh | Sept. 7, 1943 |

FOREIGN PATENTS

| | | |
|---|---|---|
| 18,618 | Great Britain | Aug. 13, 1914 |